United States Patent
Willemsen et al.

(10) Patent No.: US 12,452,327 B2
(45) Date of Patent: Oct. 21, 2025

(54) METHOD AND SYSTEM FOR TEXT SEARCH CAPABILITY OF LIVE OR RECORDED VIDEO CONTENT STREAMED OVER A DISTRIBUTED COMMUNICATION NETWORK

(71) Applicant: FLIR Unmanned Aerial Systems ULC, Vancouver (CA)

(72) Inventors: Alan Willemsen, Waterloo (CA); Spencer Quin, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 0 days.

(21) Appl. No.: 17/825,870

(22) Filed: May 26, 2022

(65) Prior Publication Data
US 2022/0385711 A1 Dec. 1, 2022

Related U.S. Application Data

(60) Provisional application No. 63/194,786, filed on May 28, 2021.

(51) Int. Cl.
| | |
|---|---|
| *H04L 65/611* | (2022.01) |
| *G06F 16/73* | (2019.01) |
| *H04N 21/2187* | (2011.01) |
| *H04N 21/2343* | (2011.01) |
| *H04N 21/274* | (2011.01) |

(52) U.S. Cl.
CPC .......... *H04L 65/611* (2022.05); *G06F 16/73* (2019.01); *H04N 21/2187* (2013.01); *H04N 21/2343* (2013.01); *H04N 21/274* (2013.01)

(58) Field of Classification Search
CPC .......... H04N 21/2187; H04N 21/2343; H04N 21/274; H04L 65/611; G06F 16/73
See application file for complete search history.

(56) References Cited

U.S. PATENT DOCUMENTS

| | | | |
|---|---|---|---|
| 8,015,159 B2 | 9/2011 | Boicey et al. | |
| 9,275,150 B2 | 3/2016 | English et al. | |
| 2008/0072256 A1 | 3/2008 | Boicey et al. | |
| 2009/0148124 A1* | 6/2009 | Athsani | H04N 21/6582 386/241 |
| 2015/0310107 A1 | 10/2015 | Alhakimi | |
| 2016/0182971 A1* | 6/2016 | Ortiz | G06F 3/0484 725/34 |
| 2017/0235828 A1* | 8/2017 | Philipose | H04N 21/2665 725/115 |
| 2019/0028465 A1* | 1/2019 | Allen | H04L 61/256 |

(Continued)

*Primary Examiner* — Yassin Alata
(74) *Attorney, Agent, or Firm* — Haynes and Boone, LLP (57) ABSTRACT

A server receives and rebroadcasts live streaming video content from a video capture device, such as a mobile phone or unmanned surveillance vehicle. The server includes a media server configured to stream selected video content to a client device, a video analysis system configured to analyze the live video content and generate object detection data, a storage system configured to store the generated object detection data and an identifier of the associated live video content, and a search engine configured to receive a text-based search request, search the object detection data stored in the storage system for relevant search results, and generate a list of live and stored video content associated with the relevant search results.

20 Claims, 6 Drawing Sheets

(56) References Cited

U.S. PATENT DOCUMENTS

2019/0132613 A1* 5/2019 Jiao .................... H04N 21/2743
2020/0344307 A1* 10/2020 Livshits ........... H04N 21/25825
2023/0019877 A1* 1/2023 Racz ................ H04N 21/64322

* cited by examiner

METHOD AND SYSTEM FOR TEXT SEARCH CAPABILITY OF LIVE OR RECORDED VIDEO CONTENT STREAMED OVER A DISTRIBUTED COMMUNICATION NETWORK

CROSS REFERENCE TO RELATED APPLICATIONS

This application claims priority to and the benefit of U.S. Provisional Patent Application No. 63/194,786 filed May 28, 2021 and entitled "METHOD AND SYSTEM FOR TEXT SEARCH CAPABILITY OF LIVE OR RECORDED VIDEO CONTENT STREAMED OVER A DISTRIBUTED COMMUNICATION NETWORK," where is hereby incorporated by reference in its entirety.

TECHNICAL FIELD

One or more embodiments of the present disclosure relate generally to content distribution and delivery systems and, more particularly, for example, to systems and methods for securely capturing and delivering media content over public and private networks, including video surveillance content captured by one or more remote devices.

BACKGROUND

In the field of image processing, there is an ongoing need for efficient and reliable ways to detect and classify objects of interest within a field of view (e.g., a scene) of an imaging device. Traditional "smart cameras" combine a machine vision imaging component and a single board computer running rules-based image processing software. These systems are used for simple problems like barcode reading or identifying a particular feature of a known object.

Machine leaning systems have been implemented to provide more complex image analysis. In one approach, various images of an object of interest are collected into a training dataset for training a neural network to classify the object. The training images may be generated with a camera capturing images of the object at various angles and in various setting. A training dataset often includes thousands of images for each object classification, and can be time consuming, expensive and burdensome to produce and update. The trained neural network may be loaded on a server system that receives and classifies images from imaging devices on a network. In some implementations, the trained neural network may be loaded on an imaging system.

Simplified machine vision and image classification systems are available, but such systems are not capable of running robust trained neural networks and are difficult to adapt to various end-use scenarios. In practical implementations, limitations on memory, processing, communications, and other system resources often lead system designers to produce classification systems directed to particular tasks. A neural network may be trained for particular classification tasks and implemented to allow for real time operation within the constraints of the system. However, in the field the trained system may encounter new objects of interest that were not included in the training data, and thus these new objects will not be accurately detected or classified.

Systems such as unmanned aerial vehicles (UAVs) can perform computer vision tasks to identify objects, but they are limited to the hardware of the aircraft and are not easily shareable with remote users. There are many computer vision services that are excellent at classifying image and video data beyond what can be done on the aircraft. The problem is how do you securely stream video from a camera such as a UAV broadcasting video over a cell network or from a fire wall restricted network to cloud based computer vision services with minimal latency and make the results searchable in near real time from remote locations.

In view of the foregoing, there is a continued need for improved object detection and classification solutions, including systems and methods for detecting and classifying objects identified during operation, and sharing video and related content over public and private networks.

SUMMARY

Various systems and methods are provided for securely broadcasting live video and training data over a public or private network using low latency protocols to a server system. The server system will decode the live video data into frames at a configurable frame rate. Parallel processes then send the images, video, and training data to a local or third-party image classification service. The image classification service responses will have text metadata describing things such as detected objects, faces, text from optical character recognition, and bounding box positions for detected items.

The server system will store the text metadata in a search engine. The server system will also store the images and record the live video for video on demand playback. The server system will also allow authenticated users via an api or browser to enter search criteria and view past images or video segments matching the search criteria. Users can also watch the live video from a remote system such as a web browser using WebRTC and be notified of items matching the search criteria as they arrive. Users will also be allowed to annotate live or recorded video or images to provide training data to the system.

In various embodiments, a server system is configured to receive and rebroadcast live streaming video content, and includes a media server configured to stream selected video content to a client device; a video analysis system configured to analyze the live video content and generate object detection data; a storage system configured to store the generated object detection data and an identifier of the associated live video content; and a search engine configured to receive a text-based search request, search the object detection data stored in the storage system for relevant search results, and generate a list of live and stored video content associated with the relevant search results.

In some embodiments, the media server streams the video content across a network using a video conferencing protocol or live broadcast protocol and allows multiple clients to process live video and record and store for viewing by authorized client devices. In some embodiments, the live streaming video content is received from a video capture device over a wireless communications network, and the video capture device is authenticated to the server system through an identity server. In some embodiments, the video analysis system is configured to decode the live video stream, transmit the decoded video to a computer vision application server using a configurable computer vision application programming interface, wherein the computer vision application server analyzes the transmitted video and returns object detection data, and store the object detection data in the search engine.

In some embodiments, live search results are continually updated during the live video stream and the search engine is configured to provide for display the search results along with associated images and/or video. The server system is configured to receive annotations from the client device, the annotations associated with the select video content.

In some embodiments, a method includes authenticating a video capture device against an identify provider to obtain an access code associated with resources of a server system, establishing a websocket connection from the video capture device to the server system using transport layer security to the server system and authenticates using the obtained access code, and receiving from the client device a live video stream. The authenticating may include using an Oauth protocol in some embodiments. The websocket connection may be used for WebRTC negotiation between the video capture device and the server system, and after WebRTC negotiation, the video capture device is configured to send video to the server system using a negotiated transport protocol, encryption keys, cypher, hostname, and port.

In some embodiments, a peer-to-peer connection between the video capture device and the server system is established for transmitting the video. The peer-to-peer connection is established using WebRTC in conjunction with Interactive Connectivity Establishment (ICE), Session Traversal Utilities for NAT (STUN), and/or Traversal Using Relays around NAT (TURN). The peer-to-peer connection enables processing of the video through network firewalls. The method may further include encrypting, by the video capture device, the encoded video and sending it using Secure Real-Time Transport Protocol and User Datagram Protocol, to reduce overhead and latency.

The scope of the disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

Aspects of the present disclosure generally relate to capturing, storing, searching, and delivering live or recorded video and related content and include, in various embodiments, methods and systems for securely broadcasting live video and training data over a public or private network using low latency protocols to a server system. In some embodiments, the server system is configured to decode live video data into frames at a configurable frame rate. Parallel processes then send the images, video, and training data to an image classification service. The image classification service responds with text metadata describing detected objects, faces, text from optical character recognition, bounding box positions, and other information for items detected in the images and video.

In various embodiments, the server system is configured to store the text metadata in a storage system for access by search engine. The server system is also configured to store the images and live video for video-on-demand playback. In some embodiments, the server system allows authenticated users to access the search engine and stored image and video content via an application programming interface (API) or browser. In one embodiment, a user enters search criteria and is able to view past images or video segments matching the search criteria. Users can also access the server system to watch live video from one or more remote user devices such as a web browser using Web Real-Time Communication (WebRTC) protocol and be notified of items matching search criteria as they arrive. The user may also be provided with an interface allowing the user to annotate live or recorded video or images to provide training data to the system.

In various embodiments, a server system is configured to receive and rebroadcast live streaming video content, and includes a media server configured to stream selected video content to a client device; a video analysis system configured to analyze the live video content and generate object detection data; a storage system configured to store the generated object detection data and an identifier of the associated live video content; and a search engine configured to receive a text-based search request, search the object detection data stored in the storage system for relevant search results, and generate a list of live and stored video content associated with the relevant search results.

In some embodiments, the media server streams the video content across a network using a video conferencing protocol or live broadcast protocol and allows multiple clients to process live video and record and store for viewing by authorized client devices. In some embodiments, the live streaming video content is received from a video capture device over a wireless communications network, and the video capture device is authenticated to the server system through an identity server. In some embodiments, the video analysis system is configured to decode the live video stream, transmit the decoded video to a computer vision application server using a configurable computer vision application programming interface, wherein the computer vision application server analyzes the transmitted video and returns object detection data, and store the object detection data in the search engine.

In some embodiments, live search results are continually updated during the live video stream and the search engine is configured to provide for display the search results along with associated images and/or video. The server system is configured to receive annotations from the client device, the annotations associated with the select video content.

Figure 1A:
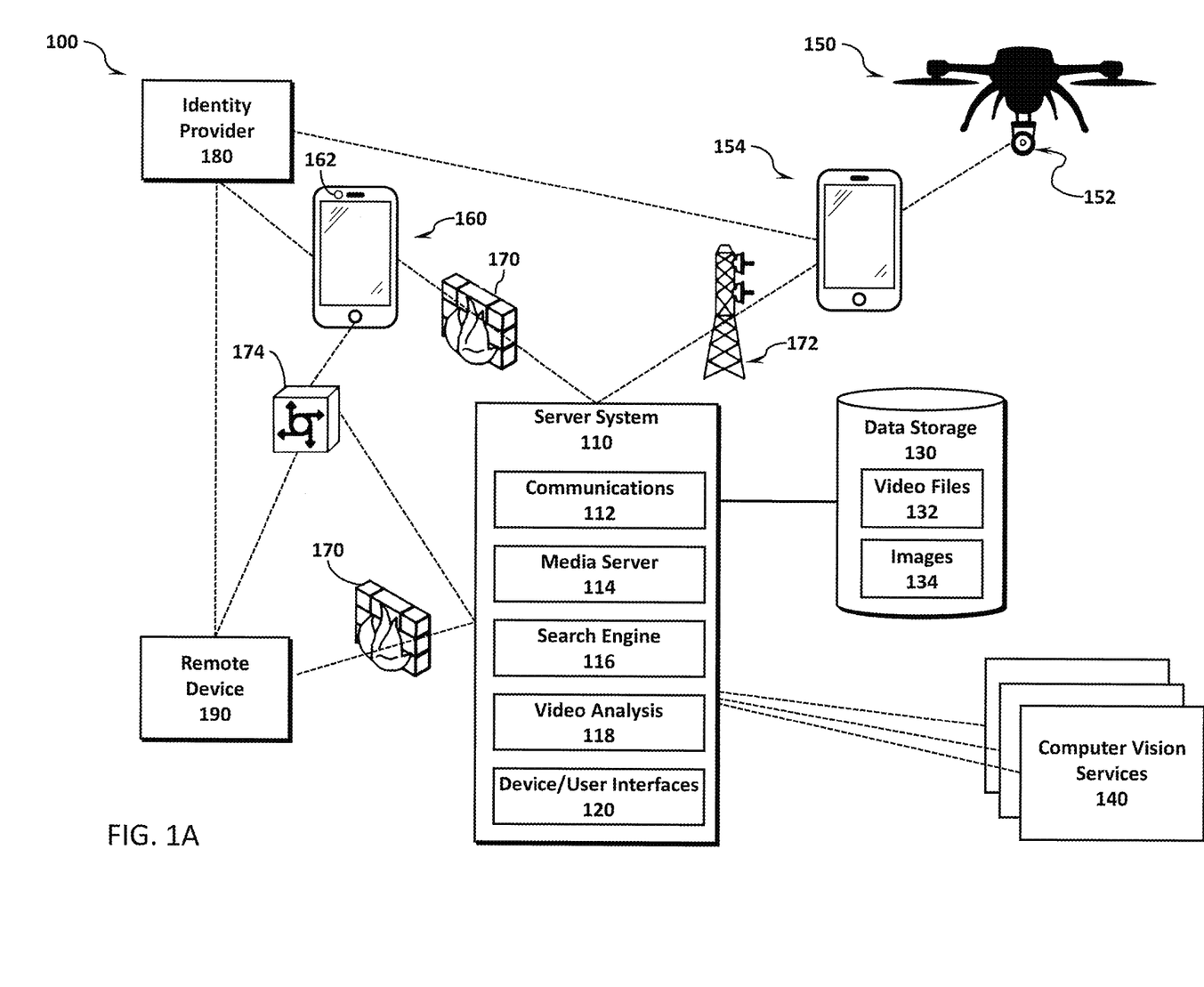
FIG. 1A illustrates a system for facilitating text search capabilities of live or recorded video content streamed over a distributed communication network, in accordance with one or more embodiments.
Figure 1B:
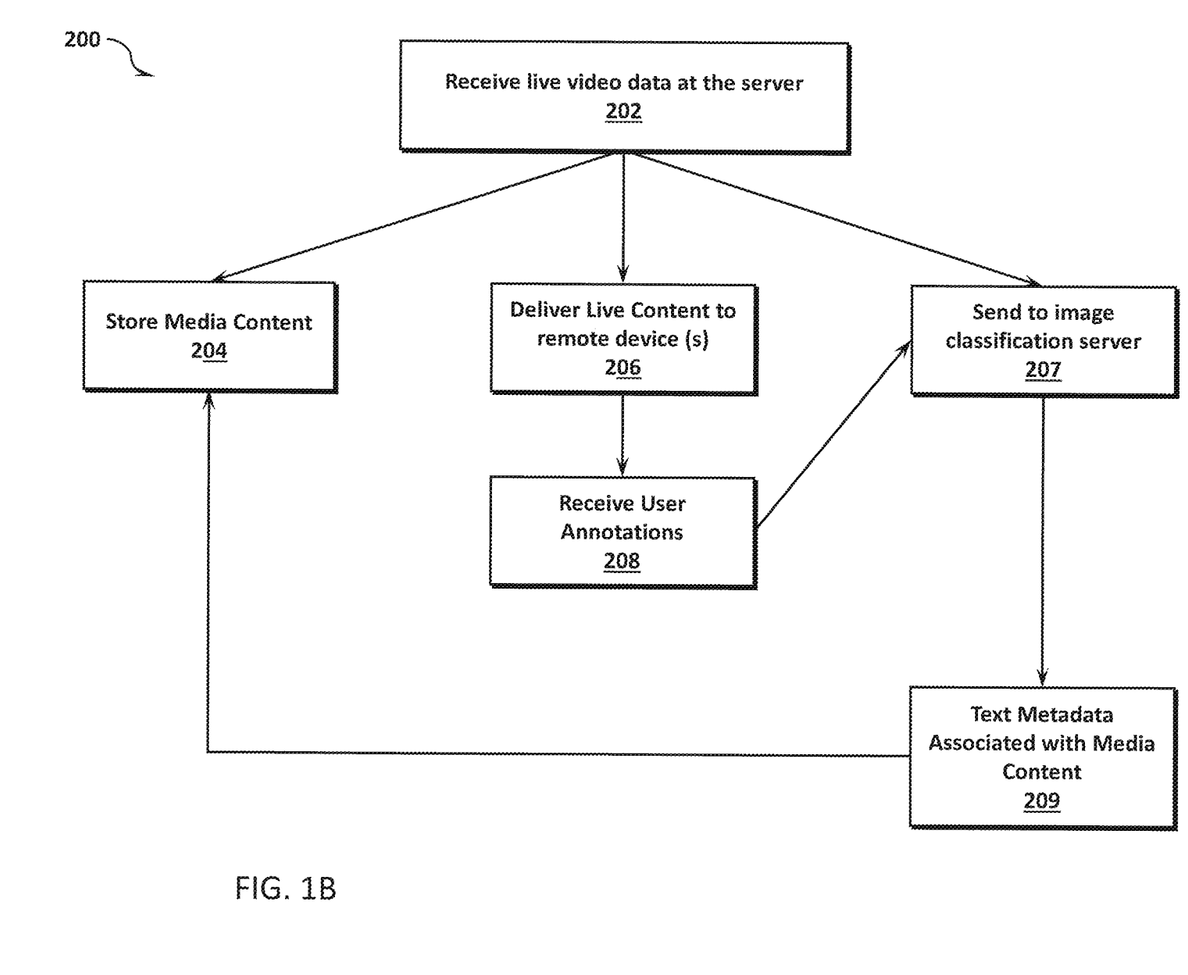
FIG. 1B illustrates a method for facilitating text search capabilities of live or recorded video content streamed over a distributed communication network, in accordance with one or more embodiments.

Referring to FIGS. 1A and 1B, a system and method for facilitating text search capabilities of live or recorded video content streamed over a distributed communication network will now be described, in accordance with one or more embodiments. A system 100 includes a server system 110 comprising one or more application servers, web servers, cloud servers, or other suitable server system. In the illustrated embodiment, the server system 110 includes communications components 112 configured to facilitate communications with one or more systems or devices, media services components 114 configured to receive and deliver media content, such as a video stream and image data, from/to one or more remote devices, a search engine 116 configured to facilitate search services for annotated media content as described herein, data management services 118 configured to facilitate the annotation and storage of media content, including interfacing with computer vision services 140, and device and user interfaces 120 configured to facilitate one or more of the remote processes disclosed herein, including providing a user interface to a remote device and receiving annotations of delivered media content.

The communications components 112 may include circuitry for communicating with other devices using various communications protocols. In various embodiments, communications components 112 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 112 may be further configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications components 112. The communication components 112 may be implemented as a network interface component adapted for communication with a single network or a combination of multiple networks, and may include a wired or wireless network, including a wireless local area network, a wide area network, a cellular network, the Internet, a cloud network service, and/or other appropriate types of communication networks.

A process 200 (FIG. 1B) for facilitating text search capabilities of live or recorded video content streamed over the system 100, includes receiving live video data at the server system 110, step 202. In some embodiments, the server system 110 is configured to decode live video data into frames at a configurable frame rate. Parallel processes include storing the received media content in a data storage 130 (step 204), sending the images, video, and training data to an image classification service (e.g., computer vision service 140) (step 207) and delivering the live content to one or more remote device (step 206). In some embodiments, the remote device includes a user interface facilitating user annotation of the live video feed and the annotations are provided to the image classification server 207 for further processing (step 208). The image classification service responds to the received media data with text metadata 209 describing detected objects, faces, text from optical character recognition, bounding box positions, and other information for items detected in the images and video. The information is stored in data storage 130 where it may be located via search engine 116, which provides search capabilities based, at least in part, on a search of the stored text metadata.

Embodiments include systems where objects are detected in images, which detection may be supplemented by object data from other sensor components and processed based on a determination of user interest in the object. The system 100 may operate in real-time or be configured to record and play back image and object data that was captured by the system 100 during the detection of the object, providing the remote user (e.g., a user of remote device 190) with an ability to search for detected objects, see objects in video and image, and provide annotations to supplement the stored text metadata. The user interface may include a real-time virtual reality, augmented reality or other interface capable of displaying data from an image capture system.

In various embodiments, the image capture systems may include any device configured to capture video or image data and facilitate communications of the captured video and images to the server system 110. For example, an image capture system may include an unmanned surveillance vehicle 150 (e.g., an unmanned aerial vehicle (UAV), an unmanned ground vehicle (UGV), an unmanned marine vehicle (UMV), etc.) including a camera 152 for capturing video of an environment. The unmanned surveillance vehicle may capture sensor data from an environment and provide the data to a control station 154, such as a mobile phone that communicates the captured data to the server system over a network (e.g., a cellular network 172), such as via a live video broadcast using the secure real-time transport protocol (SRTP), real-time messaging protocol (RTMP) and/or other suitable real-time protocol. In some embodiments, the control station 154 and/or user of the control station 154 is authenticated for access to the server system 110 through identity provider 180 (e.g., using OAuth or other standard/protocol for authenticating clients and providing clients with secure delegated access to resources of the server system 110). The server system 110 processes and stores the received media content, including any received metadata, and requests further processing by computer vision services 140, which performs object detection, classification, localization and/or other processing on the captured data.

For example, a system 100 may include an unmanned aerial vehicle (UAV) configured to sense, classify and locate objects in its environment, while in wireless communication with the control station 154 that facilitates additional processing and control. The UAV may include a runtime object detection and classification module that is configured to capture and process images from camera 152 and provide some preliminary object detection and classification tasks.

In some embodiments, the image capture systems may include a mobile device 160 with a camera 162 for capturing and/or streaming video. The mobile phone 160 is authenticated to the server system 110 through identity provider 180 (e.g., using OAuth or other suitable authentication/access process) and accesses the server system 110 through one or more firewalls 170. In some embodiments, the system 100 may facilitate peer-to-peer communications, such as through gateway 174. The gateway 174 may facilitate communication using any known network protocol suitable for performing the processes described herein, including using the traversal using relay network address translator (TURN) protocol, the session traversal utilities for network address translator (STUN) protocol, other protocols. In various embodiments, the mobile device 160 access the server system 110 through peer-to-peer communications, the gateway 174, the Internet, a cellular/wireless network, or other communications infrastructure.

In some embodiments, image classification services include one or more object detection and classification systems, such as a trained artificial intelligence system, such as a convolutional neural network (CNN) classifier, that outputs a location of a box around detected objects in a captured image. In various embodiments, the video capture devices and computer vision services 140 are configured to capture and process visible light images, infrared images, and/or other image types.

The various components of system 100 may be implemented on one or more servers such as an application server that performs data processing and/or other software execution operations for generating, storing, classifying and retrieving images. In some embodiments, the illustrated components may be distributed across one or more communications networks. In various embodiments, the computer vision services 140 may operate as a general-purpose image classification system, such as a cloud-based image classification system, or may be configured to operate in a dedicated system, such as a video surveillance system that stores video and images captured in real time from a plurality of image capture devices and identifies and classifies objects.

The various components of system 100 include one or more processors that perform data processing and/or other software execution operations for the system 100. The processor may include logic devices, microcontrollers, processors, application specific integrated circuits (ASICs), field programmable gate arrays (FPGAs) or other devices that may be used by the infrared image classification system to execute appropriate instructions, such as software instructions stored in a memory. The memory may be implemented in one or more memory devices (e.g., memory components) that store executable instructions, data and information, including image data, video data, audio data, network information. The memory devices may include various types of memory for information storage including volatile and nonvolatile memory devices, such as RAM (Random Access Memory), ROM (Read-Only Memory), EEPROM (Electrically-Erasable Read-Only Memory), flash memory, a disk drive, and other types of memory described herein.

Each network device may be implemented as a computing device such as a desktop computer or network server, a mobile computing device such as a mobile phone, tablet, laptop computer or other computing device having communications circuitry (e.g., wireless communications circuitry or wired communications circuitry) for connecting with other devices in the system 100.

In various embodiments, the server system 110 is configured to store the text metadata in a data storage 130 for access by the search engine 116. The server system 110 is also configured to store the images and live video for video-on-demand playback. In some embodiments, the server system 110 allows authenticated users to access the search engine 116 and stored images 134 and video files 132 via an application programming interface (API) or browser. In some embodiments, a user enters search criteria and is able to view past images or video segments matching the search criteria. Users can also access the server system 110 to watch live video from one or more remote user devices such as a web browser using Web Real-Time Communication (WebRTC) protocol and be notified of items matching search criteria as they arrive. The user may also be provided with an interface allowing the user to annotate live or recorded video or images to provide training data to the system.

Various advantage of the system 100 will now be described. The embedded computer vision capabilities in devices such as that used by unmanned surveillance vehicle 150, mobile device 160, and other mobile devices are often limited by the limited processing, memory, and power resources available to mobile devices. In contrast, computer vision services (e.g., computer vision services 140) with dedicated hardware and more robust software and data resources can analyze visual content with better results (e.g., greater accuracy, more detail, more complex algorithms, more robust data results, etc.) than a mobile embedded system. However, modern system face limitations in using a remote dedicated computer vision services for analysis in near real-time live scenarios that are addressed by system 100 and the systems and methods disclosed herein.

To be able to take advantage of the dedicated server system of FIG. 1A, the system 100 is configured to perform computer vision analysis of live video content and includes systems and methods to get the live video to the computer vision services in a format that can be analyzed. The system 100 is able to perform live video analysis securely, with minimal latency, and over various public and/or private networks. Traditional methods for broadcasting live video from cameras involve using a private network with protocols such as Real Time Streaming Protocol (RTSP). These methods are difficult to secure for transmission over public networks and require control of firewalls between the camera and the server systems.

In many implementations, to send the live video from systems such as UAVs (e.g., unmanned surveillance vehicle 150) or other mobile cameras (e.g., mobile phone camera 162) to a remote server (e.g., server system 110) for analysis, there needs to be a secure way to broadcast over various network topologies with minimal latency. In the illustrated embodiment, the remote server utilizes the computer vision processing of one or many dedicate external services (e.g., computer vision services 140) depending on needs which can change over time.

The systems and methods of the present application are configured to enable a remote device (e.g., remote device 190) to query the results of the computer vision services 140 in near real-time and to be able to see the results visual content. To further aid in the accuracy of the computer vision machine learning capabilities, the present disclosure includes a way to annotate videos or images to provide training data to one or more of the computer vision services.

In various aspects of the present disclosure, video conferencing and broadcast protocols suitable for streaming live video over challenging networks with low latency are used. The system provides a simpler alternative to broadcast low latency video when broadcasting over a cell network and/or a way to transmit video from devices that require video to be transmitted using a secure real-time messaging protocol (RTMPS). In some embodiments, the system uses an internal video conferencing media server (e.g., media services components 114) to allow multiple parallel consumers to process live video, record live video, or for viewing by clients. In some embodiments, the system decodes live video and uses configurable third-party computer vision application programming interface to analyze the video and store the results in a search engine. The system may be configured to record the live video, provide a way to subscribe for live search results as they appear, provide a way to make text queries against the search engine and view results along with images and video, and provide a way to annotate live or recorded video and images to provide training data.

The systems and methods of FIGS. 1A and 1B allow authorized users of a mobile device to broadcast camera video streams to a server while minimizing latency over various network topologies. In some embodiments, a user using a device with camera access will authenticate against an identity provider via the Oauth 2.0 protocol to obtain an access code. The device makes a websocket connection using transport layer security (TLS) to the server and authenticates using the obtained access code.

The websocket connection is used for WebRTC negotiation between the mobile device and the server. After WebRTC negotiation is complete then the mobile device will know what transport protocol, encryption keys, cypher, hostname, and port to use when sending the video. WebRTC in conjunction with Interactive Connectivity Establishment (ICE), Session Traversal Utilities for NAT (STUN), and Traversal Using Relays around NAT (TURN) allows for a peer-to-peer connection between the camera and the server processing the video over various real-world firewall configurations. The device then encrypts the encoded video and sends it using SRTP (Secure Real-Time Transport Protocol). The data is also sent using UDP (User Datagram Protocol) which avoids the overhead and latency of TCP. If firewall restrictions prevent UDP then TCP is used as a fallback.

In another embodiment, a simpler method is provided for devices wanting to broadcast SRTP without WebRTC for networks without firewall restrictions such as mobile devices over a regular cell networks. A device user authenticates against an identity provider via the Oauth 2.0 protocol to obtain an access code. The mobile device uses the access code to make a TLS HTTPS request to the server to obtain the encryption keys, cypher, hostname, and port needed to send the video. The device then encrypts the encoded video and sends it using SRTP over UDP to the server.

In another embodiment, a method for broadcasting live video to the server from a device that uses a secure real-time messaging protocol (RTMPS) is provided. The user logs into the browser interface to obtain the rtmps url which contains a url with a secret key. The device broadcasts video using RTMPS to the server using the obtained url and secret key. When the server system receives the video, it needs to provide it to multiple consumers for recording, for analysis, and for viewing. This is achieved by using an internal WebRTC media server. The server system manages pipelines on the media server connecting the incoming video with the different consumers.

Computer vision is constantly evolving as new techniques and models are developed and also require specialized knowledge. They are also difficult to deploy because they often need specialized graphics processing unit (GPU) hardware. The system outsources this processing to dedicated services that provide an application programming interface (API). The system is configured to use services that suites the need of the user and uses the following methods to index content. As the server receives the video data it creates images from decoded video frames at a configurable rate. As the images are being generated they are sent to one or many computer vision systems using the APIs configured in the system. The images are also stored in a file system to be used later when showing search results. The computer vision system's api responds with json or xml text describing the image content. Results may also have points of interest or reference locations of bounding boxes within the image. The text response is stored in a search engine along with other metadata such as timestamps, the location of the stored image, and location of the recorded video. A process consumes the live video using WebRTC and records it. The video is recorded to file as it is being received in a format suitable for viewing video on demand such as HTTP Live Streaming (HLS). This allows the recorded video to be viewed while it is being recorded. As the text is being stored in the search engine it is also examined to see if it matches any currently active search criteria and notifies querying clients as the information arrives.

In some embodiments, the system has a user interface that authenticated users can access from a browser that lets them view the live data or to playback recorded video on demand. The live data is served using WebRTC to minimize latency. The playback of recorded video on demand is served from HLS files and can be viewed while the video is being recorded. The user interface also has fields where users can enter search criteria. Search results include images matching the search criteria retrieved from the search engine plus matching live results as they occur in near-real-time. Result images show relevant bounding boxes and other relevant metadata and can link to the recorded video positioned at the time of the image. An API is also available where a client can obtain an access token via Oauth authentication and query for search results over a TLS secured websocket which can provide past and live results.

Authenticated users can provide training data by annotating live or recorded video or images from a browser or other user interface. The training data can be sent in real time to computer vision systems to aid in machine learning and to find specific things like people, animals and such.

Object detection, which deals with identifying and locating objects of certain classes in the image, has been widely used. However, the current mainstream usage scenario is that application providers predefine the categories to be discovered, and it is difficult for users to easily customize the categories they are interested in. The present disclosure describes a practical live training solution and a novel dual-task object detector to allow users to detect other objects of interest that are not defined by the predefined categories.

In various embodiments, systems and methods disclosed herein facilitate user review of live video and/or object detections from computer vision services, providing an additional error check to identify false or inaccurate object detections and update the training of computer vision services 140 in real time. For example, a system implemented in an unmanned surveillance vehicle may operate in an exploration mode where it detects, classifies and localizes objects. The unmanned surveillance vehicle or an associated control station may authenticate through identity provider 180 and upload captured video and/or images and corresponding metadata (e.g., object detection information) to the sever system 110. In some embodiments, the server system 110 executes a plurality of parallel processes on the received video and related content. In a first process, the server system 110 is configured to stream the live and/or recorded video to one or more remote devices 190. In some embodiments, the remote device 190 presents a user interface allowing an operator to further annotate the video based on a visual identification of the captures images and upload the annotations to the server system 110 in real-time. In a second process, the server system 110 forwards received video content and related metadata (e.g., object detection information from the unmanned surveillance vehicle and/or annotations from the remote device 190) to a computer vision service 140 for a more robust object detection and classification analysis and receives corresponding text metadata. In a third process, the server system 110 stores the video and related metadata in a data storage 130 for access through a search engine 116. Through these processes, a live video stream may be text searchable in near real-time based on real-time object detection and annotation, and the metadata is continually updated during the live feed.

In some embodiments, data describing objects detected by a sensor system (e.g., an unmanned surveillance vehicle) are automatically detected, localized and mapped, and may include human-in-the-loop annotations through a remote device 190, facilitated through the server system 110. An operator of the remote device 190 may view video, images, object information and other associated data and approve, update and/or add various parameters, such as detected type, position, color, and/or other parameters. The system may be configured to record and play back data that was captured by the sensor system during the detection of the object, providing the remote device operator a view of what led up to the detection of the object and the ability to supplement or correct the object information (e.g., object classification, object position, etc.). The user interface may include a real-time virtual reality, augmented reality or other three-dimensional interface of the 3D map and other telemetry data from the unmanned surveillance vehicle to provide the user with additional views to make it easier for the user to approve/refine the collected sensor data. In some embodiments, the system is configured to capture visible images of a scene, and other data from one or more sensors, such as point cloud data from a light detection and ranging (Lidar) system, real-world coordinate information from a global positioning satellite (GPS) system, infrared images, and/or other data from other sensor systems that applies to the scenario.

In some embodiments, the detection of objects by the computer vision systems is performed using a trained artificial intelligence system, such as a deep neural network (DNN) or convolutional neural network (CNN) classifier that outputs a location of a box around detected objects in a captured image. In some cases, further detail may be desired, such as an understanding of the location of a reference point on the detected object. The systems described herein may be configured to create an augmentation to the data created by the artificial intelligence system, providing the user with an interface (e.g., through a remote device 190) to verify or correct a particular point of interest and then update data annotations. The present disclosure may be used with an artificial intelligence, machine learning, neural network or similar system that identifies an object type and/or class and the object position. In various embodiments, the classifier also outputs a probability indicating a confidence factor in the classification. The system is adaptable to a variety of machine learning frameworks, even systems that produce a large amount of error in the classification, provided the system produces a reasonable starting point for local/global object tracking framework and/or the user to make the correction.

Figure 2:
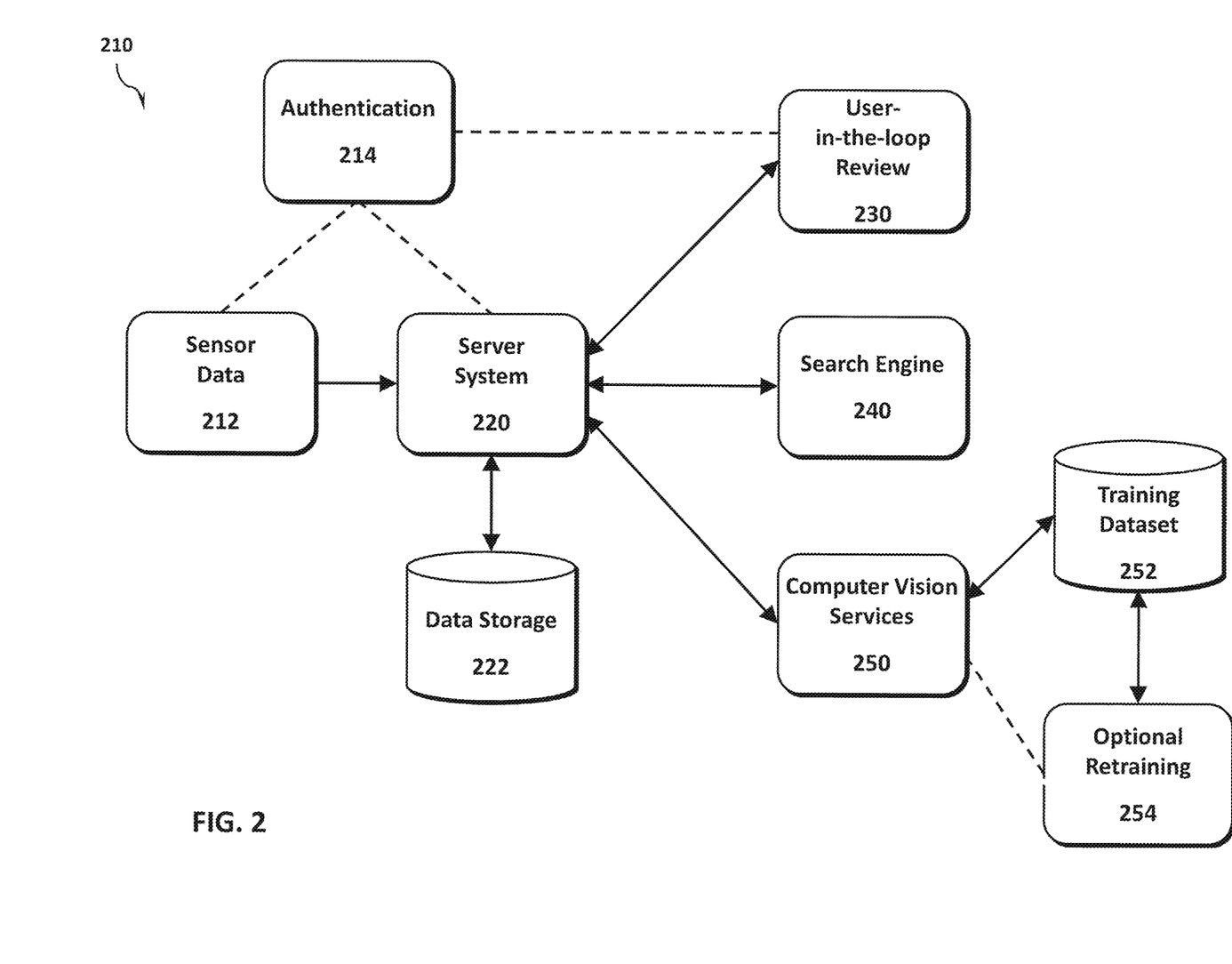
FIG. 2 illustrates an example operation of a server system, in accordance with one or more embodiments.

An example operation of user-in-the loop object detection using the systems and methods described in FIGS. 1A and 1B will now be described in further detail with reference to FIG. 2. A process 210 receives sensor data 212, including video and/or image data, from one or more sensor systems of a video capture device, such as an unmanned ground vehicle, an unmanned aerial vehicle (UAV), unmanned marine vehicle, a mobile phone, or other device that includes a sensor for acquiring environmental data, and (optionally) a processing component for detecting objects in the sensor data.

An authentication process 214 authenticates the video capture device and grants access to one or more resources of a server system 220. In some embodiments, a method includes authenticating a video capture device against an identify provider to obtain an access code associated with resources of a server system, establishing a websocket connection from the video capture device to the server system using transport layer security to the server system and authenticates using the obtained access code, and receiving from the client device a live video stream. The authenticating may include using an Oauth protocol in some embodiments. The websocket connection may be used for WebRTC negotiation between the video capture device and the server system, and after WebRTC negotiation, the video capture device is configured to send video to the server system using a negotiated transport protocol, encryption keys, cypher, hostname, and port.

In some embodiments, a peer-to-peer connection between the video capture device and the server system is established for transmitting the video. The peer-to-peer connection is established using WebRTC in conjunction with Interactive Connectivity Establishment (ICE), Session Traversal Utilities for NAT (STUN), and/or Traversal Using Relays around NAT (TURN). The peer-to-peer connection enables processing of the video through network firewalls. The method may further include encrypting, by the video capture device, the encoded video and sending it using Secure Real-Time Transport Protocol and User Datagram Protocol, to reduce overhead and latency.

The server system 220 has an associated data storage 222 for storing media content and metadata, including object detection and classification data associated with the media content. The received sensor data is provided to computer vision services 250 for further video analysis. In some embodiments, the computer vision services 250 includes trained inference models configured to receive sensor data and metadata from the server system 220, and output detected objects, object locations, object classifications, a classification confidence factor, and/or other metadata. In some embodiments, the trained inference model includes a convolutional neural network trained on a training dataset 252 to detect, classify and locate objects in the sensor data. The trained inference model may further include sensor data processing components for one or more of the sensors such as image processing algorithms, radar data processing algorithms, Lidar processing algorithms, and/or other sensor data processing algorithms.

A user-in-the-loop-review process 230, may operate on an authenticated remote server and include viewing live and/or recorded video, including available information related to detected objects and object classifications. The user interface may include a display and control over video of the detection, including forward, reverse, pause, zoom, and other video controls as known in the art. The user annotations are provided to the server system 220 and stored in data storage 222, which may include one or more of a local storage device, a networked storage device, a cloud storage device, or other suitable storage device or system.

After annotations are made by the user to objects detected during the video, the news/corrected object classification information may be forwarded to one or more computer vision services for use in a training dataset 252. In an optional retaining process 254, the system retrains one or more inference models using the updated training dataset 252 and replace the trained inference model if certain criteria are met. In one embodiment, the performance of the updated artificial intelligence training model is tested using a test dataset, and the results are compared against the performance of the current trained inference model using the same dataset. The system may be configured, for example, to replace the trained inference model if the performance of the updated model is above a certain threshold factor.

The search engine 240 may include any search algorithm or technique for processing a text-based search query for metadata stored in the database. A user interface may be provided including fields where users can enter search criteria. Search results may include images matching the search criteria retrieved from the search engine plus matching live results as they occur in near-real-time. Result images show relevant bounding boxes and other relevant metadata and can link to the recorded video positioned at the time of the image.

Figure 3:
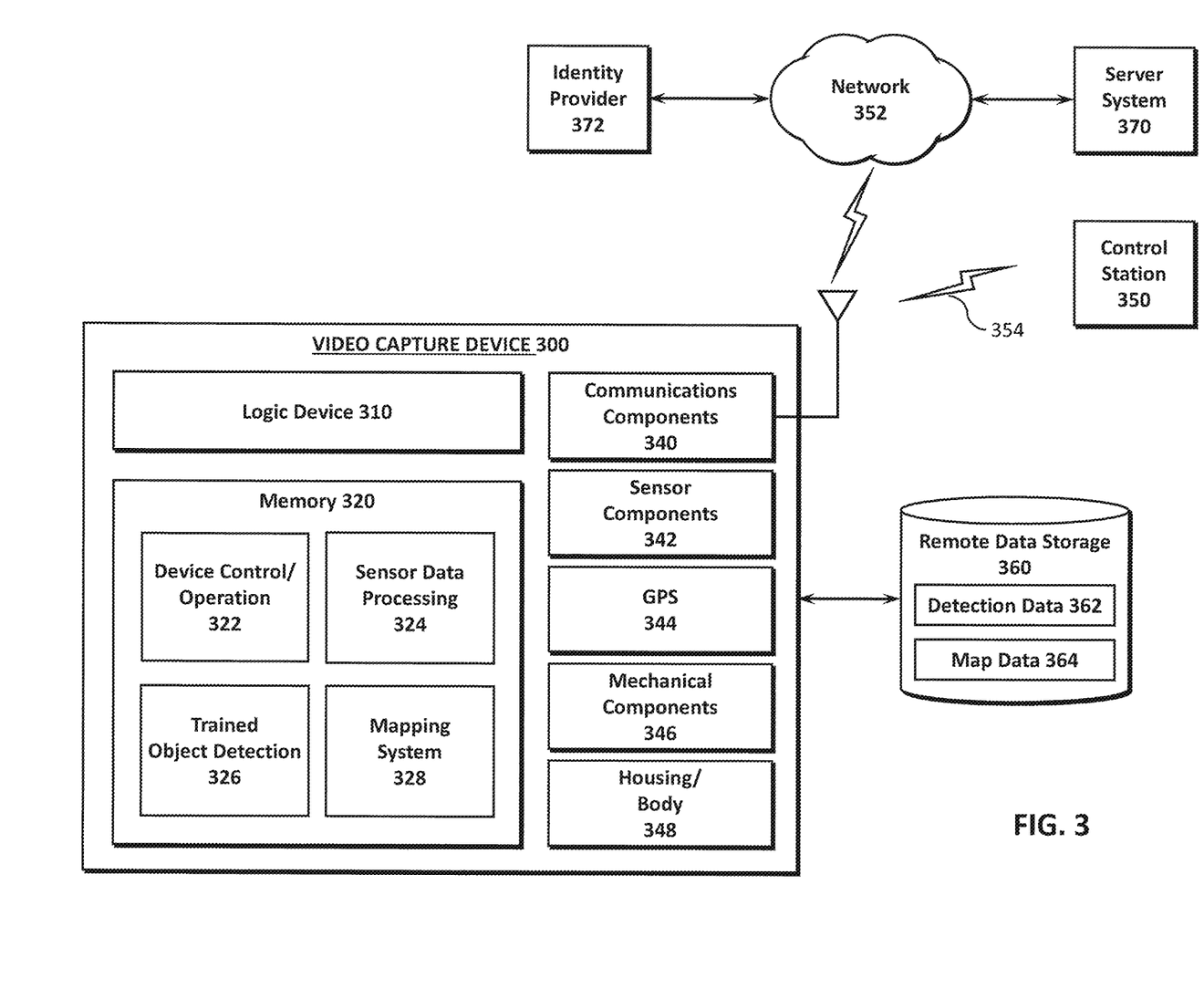
FIG. 3 illustrates an example video capture device, in accordance with one or more embodiments.

An example embodiment of a video capture device will now be described with reference to FIG. 3. In some embodiments, a video capture device 300 is configured to communicate with a control station 350 over a wireless connection 354 or other suitable connection. As illustrated, the video capture device 300 may include an unmanned vehicle, such as a UGV, UAV or UMV or other device configured to travel and collect environmental data. In various configurations, the user may control, interact and/or observe the activity of the video capture device 300 through the control station 350 in real-time and/or review, correct and add object detections via a remote device accessing the server system. Although an unmanned vehicle is illustrated in FIG. 3, it will be appreciated that the video capture device 300 may include any device (e.g., a mobile phone) configured for authentication through the identity provider 372 and capturing and streaming video to the server system 370, as described herein.

The video capture device 300 is generally configured to capture and analyze sensor data to detect and classify objects. The video capture device 300 includes a logic device 310, a memory 320, communications components 340, sensor components 342, GPS 344, mechanical components 346, and a housing/body 348.

Logic device 310 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), a graphics processing unit and/or any other appropriate combination of processing device and/or memory configured to execute instructions to perform any of the various operations described herein. Logic device 310 is adapted to interface and communicate with components 320, 340, and 350 to perform method and processing steps as described herein.

It should be appreciated that processing operations and/or instructions may be integrated in software and/or hardware as part of logic device 310, or code (e.g., software or configuration data) which may be stored in memory 320. Embodiments of processing operations and/or instructions disclosed herein may be stored by a machine-readable medium in a non-transitory manner (e.g., a memory, a hard drive, a compact disk, a digital video disk, or a flash memory) to be executed by a computer (e.g., logic or processor-based system) to perform various methods disclosed herein.

Memory 320 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory.

In various embodiments, logic device 310 is adapted to execute software stored in memory 320 and/or a machine-readable medium to perform various methods, processes, and operations in a manner as described herein. The software includes device control and operation instructions 322 configured to control the operation of the remote device, such as autonomous driving, data acquisition, communications and control of various mechanical components 346 of the video capture device 300. The software further includes sensor data processing logic 324 configured to receive captured data from one or more sensor components 342 and process the received data for further use by the video capture device 300. The software may further include trained object detection models 326 configured to receive processed sensor data and output object detection and classification information that may include object location and a confidence factor for the classification. The memory 320 also stores software instructions for execution by the logic device 310 for mapping the environment. The mapping system 328 is configured to use the sensor data, object detection and classification information, GPS data from GPS 344, and other available information to construct a map of the sensed environment as the video capture device 300 traverses the area. The memory 320 is further configured to store object detection data 362, and map data 364. In some embodiments, the video capture device 300 includes a separate remote data storage 360.

The sensor components 342 include a plurality of sensors configured to sense and capture information about the surrounding environment. The sensor components 342 include one or more image sensors for capturing visible spectrum and/or infrared spectrum images of a scene as digital data. Infrared sensors may include a plurality of infrared sensors (e.g., infrared detectors) implemented in an array or other fashion on a substrate. For example, in one embodiment, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. Infrared sensors may be implemented, for example, as microbolometers or other types of thermal imaging infrared sensors arranged in any desired array pattern to provide a plurality of pixels.

The sensor components 342 may further include other sensors capable of sensing characteristics of one or more objects in the environment, such as a radar system, a Lidar system, or other sensor system. Radar and/or Lidar systems are configured to emit a series of pulses or other signals into the scene and detect pulses/signals that are reflected back off of objects in the scene. The components produce signal data representing objects in the scene and corresponding sensor data processing logic 324 is configured to analyze the signal data to identify the location of objects within the scene. Logic device 310 may be adapted to receive captured sensor data from one or more sensors, process captured signals, store sensor data in memory 320, and/or retrieve stored image signals from memory 320.

The communications components 340 include circuitry and components (e.g., an antenna) for communicating with other devices using one or more communications protocols (e.g., a wireless communications protocol). The communication components 340 may be implemented as a network interface component adapted for communication with a network 352, which may include a single network or a combination of multiple networks, and may include a wired or wireless network, including a wireless local area network, a wide area network, a cellular network, the Internet, a cloud network service, and/or other appropriate types of communication networks. The communications components 340 are also configured, in some embodiments, for direct wireless communications with the control station 350 using one or more wireless communications protocols such as radio control, Bluetooth, Wi-Fi, Micro Air Vehicle Link (MAV-Link), and other wireless communications protocols.

GPS 344 may be implemented as a global positioning satellite receiver, a global navigation satellite system (GNSS) receiver, and/or other device capable of determining an absolute and/or relative position of the video capture device 300 based on wireless signals received from space-born and/or terrestrial sources, for example, and capable of providing such measurements as sensor signals. In some embodiments, GPS 344 may be adapted to determine and/or estimate a velocity of video capture device 300 (e.g., using a time series of position measurements).

The mechanical components 346 include motors, gears, wheels/tires, tracks and other components for moving remote control across the terrain and/or operating physical components of the video capture device 300. In various embodiments, one or more of the mechanical components 346 are configured to operate in response to instructions from logic device 310. The video capture device 300 includes a housing 348 that protects the various components of video capture device 300 from environmental or other conditions as desired.

Figure 4:
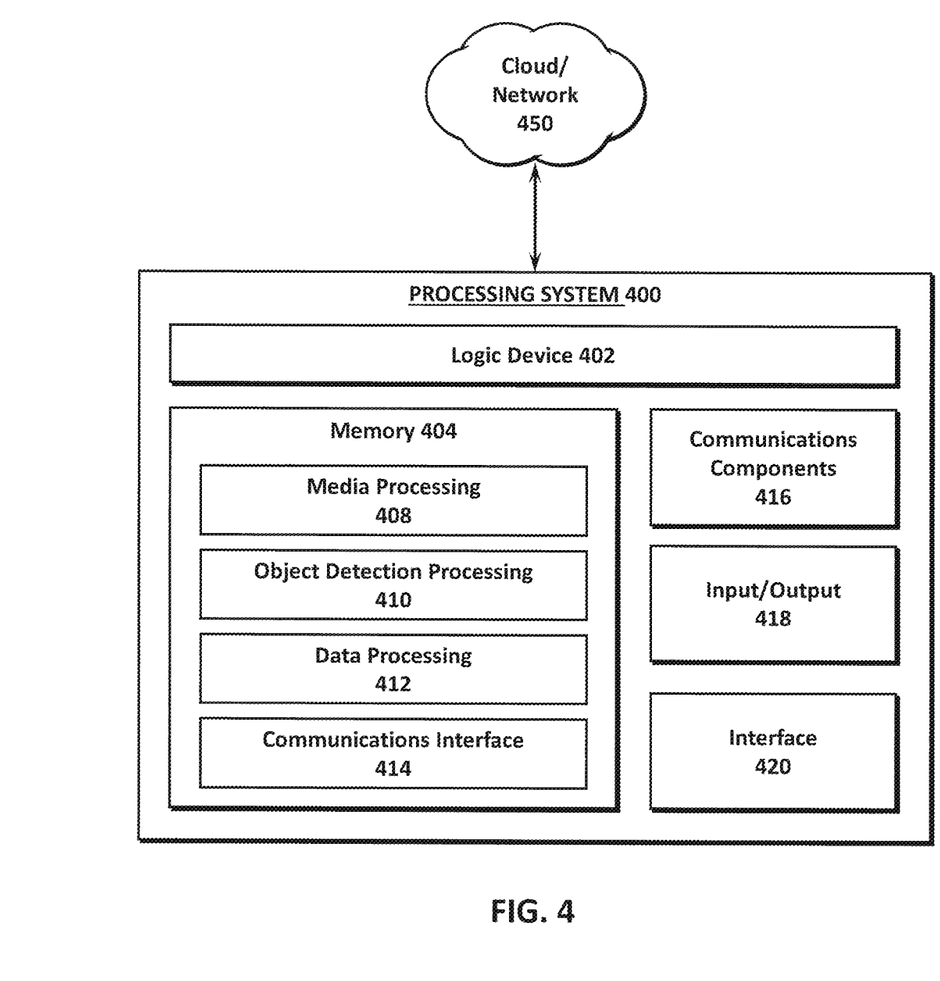
FIG. 4 illustrates an example processing system, in accordance with one or more embodiments.

An example processing system that may be used as a server system, remote device, computer vision services, mobile phone and/or other components of the system will now be described with reference to FIG. 4. A processing system 400 is configured to communicate with one or more devices across a communications link, and/or through a network, such as cloud/network 450, to interface with one or more other system components. In the illustrated embodiment, the processing system 400 includes a logic device 402, a memory 404, communications components 416, input/output components 418 and an interface 420.

The logic device 402 may be include, for example, a microprocessor, a single-core processor, a multi-core processor, a microcontroller, a programmable logic device configured to perform processing operations, a DSP device, one or more memories for storing executable instructions (e.g., software, firmware, or other instructions), a graphics processing unit and/or any other appropriate combination of processing device and/or memory configured to execute instructions to perform any of the various operations described herein. Logic device 402 is adapted to interface and communicate with various components of the processing system 400 including the memory 404, communications components 416, input/output components 418 and interface 420.

Communications components 416 may include wired and wireless interfaces. Wired interfaces may include communications links with the video capture device 300, and may be implemented as one or more physical network or device connect interfaces. Wireless interfaces may be implemented as one or more WiFi, Bluetooth, cellular, infrared, radio, MAVLink, and/or other types of network interfaces for wireless communications. The communications components 416 may include an antenna for wireless communications with the remote device during operation.

Input/output component 418 may include an image display device (e.g., a liquid crystal display (LCD)) or various other types of generally known video displays or monitors, a user input and/or interface device, such as a keyboard, a control panel unit, a graphical user interface, or other user input/output. The input/output may further include video capture components and other sensors for acquiring data. The interface 420 provides interface components for user input and/or communications with other devices.

The memory 404 stores program instructions for execution by the logic device 402 including media processing logic 408, object data processing logic 410, data processing instructions 412, communications interface logic 414 and other program logic. Data used by the processing system 400 may be stored in the memory 404 and/or stored in a separate data storage. The program instructions are configured in accordance with the desired operation of the processing system devices. Media processing logic 408 is configured to capture, stream, and/or display media content. Object detection processing logic 410 is configured to analyze media content and detect objects. Data processing logic 412 is configured to create, process, store, communicate, and search for data used by various system components including metadata. Communications interface logic 414 is configured to authenticate and facilitate authorized communications as described herein.

Figure 5A:
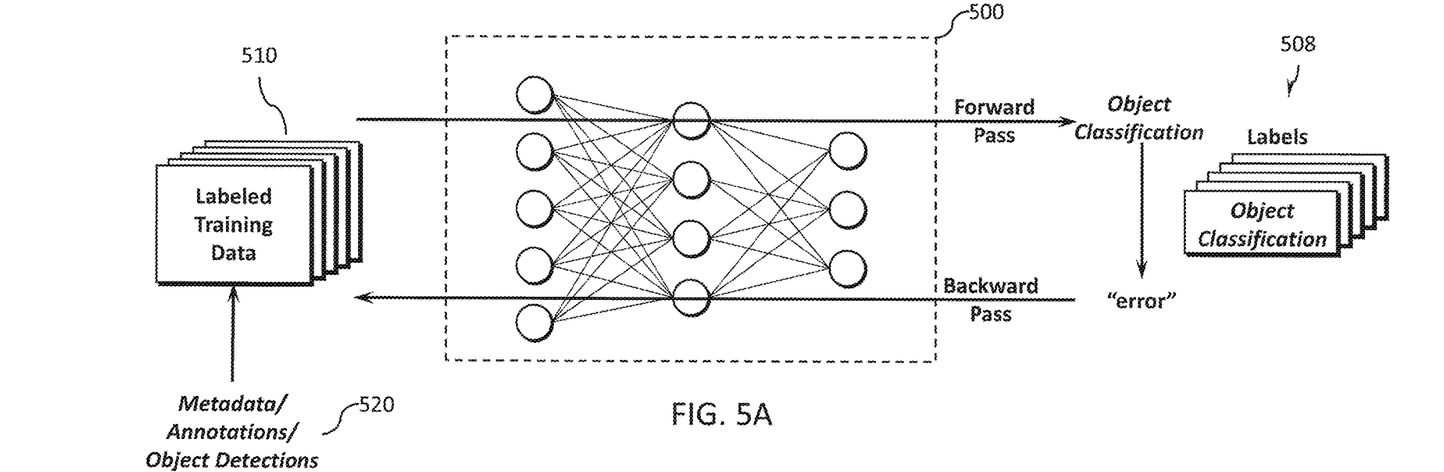
FIGS. 5A and 5B illustrate an example neural network training process and validation process, respectively, in accordance with one or more embodiments of the present disclosure.

Referring to FIG. 5A, an example a neural network that may be used to generate trained inference models will be described, in accordance with one or more embodiments. The neural network 500 is implemented as a deep neural network, convolutional neural network or other suitable neural network that receives a labeled training dataset 510 to produce object detection information 508 for each data sample. The training dataset represents captured sensor data associate with one or more types of sensors, such as infrared images, visible light images, radar signal data, Lidar signal data, GPS data, and/or other captured data. For object classification in images, the images may comprise a region of interest from a captured image that includes an object to be identified.

Figure 5B:
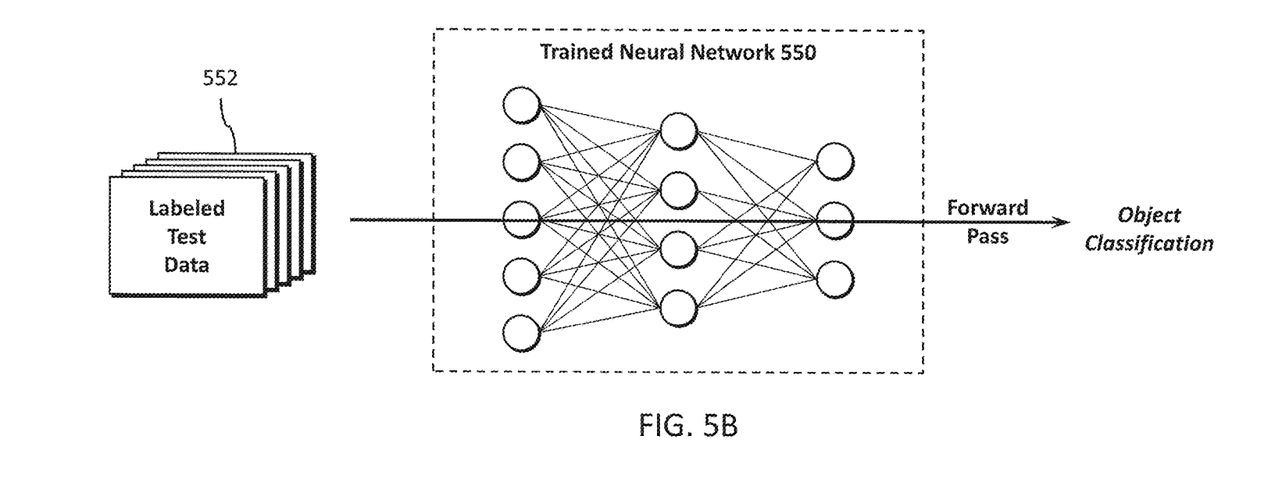

The training includes a forward pass through the neural network 500 to produce object detection and classification information, such as an object location, an object classification, and a confidence factor in the object classification. Each data sample is labeled with the correct classification and the output of the neural network 500 is compared to the correct label. If the neural network 500 mislabels the input data, then a backward pass through the neural network 500 may be used to adjust the neural network to correct for the misclassification. Referring to FIG. 5B, a trained neural network 550, may then be tested for accuracy using a set of labeled test data 552. The trained neural network 550 may then be implemented in a run time environment of the remote device to detect and classify objects. In some embodiments, the labeled training dataset 510 is updated from time to time with metadata, annotations and/or object detections 520 generated by other system devices such as metadata generated by an embedded object detection and classification system of a video capture device, or user entered annotations from a remote device. The new data may be used to supplement the training dataset to further refine the trained inference models.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a server system configured to receive and rebroadcast a live video stream captured by a sensor system, the server system comprising:
a media server configured to stream selected video content to a first client device, including the live video stream;
a video analysis system configured to, during the live video stream, analyze the live video stream and generate object detection data associated with the live video stream;
a client device interface configured to assist an operator of the first client device in providing one or more human-in-the-loop annotations associated with the live video stream to the video analysis system, wherein assisting the operator comprises performing, on the first client device, operations of:
playing back data that was captured by the sensor system and pertains to a detected object, to provide the operator with a view of what led up to the detection of the object, and providing the operator with a view of the generated object detection data;
receiving from the operator the human-in-the-loop annotations to supplement and/or correct the generated object detection data; and
supplementing and/or correcting the object detection data;
a storage system configured to store the supplemented and/or corrected object detection data, and an identifier of the live video stream; and
a search engine configured to receive a text-based search request during the live video stream from a second client device, search the object detection data stored in the storage system for relevant search results, and generate a list of live and stored video content associated with the relevant search results for selection by the second client device.

2. The system of claim 1, wherein media server streams the video content across a network using a video conferencing protocol or live broadcast protocol.

3. The system of claim 1, wherein the live streaming video content is received from a video capture device over a wireless communications network.

4. The system of claim 3, wherein the video capture device is authenticated to the server system through an identity server.

5. The system of claim 1, wherein:
the media server is configured to allow multiple clients to process live video and record and store for viewing by authorized client devices; and
assisting the operator comprises providing the operator with one or more of the following items applicable to a scenario pertaining to the detected object: data from a light detection and ranging (Lidar) system in the sensor system, real-world coordinate information from a global positioning satellite (GPS) system, and/or infrared images from the sensor system.

6. The system of claim 1, wherein the video analysis system is a computer vision system configured to use a trained artificial intelligence system generating the object detection data based on a training dataset and to use the supplemented and/or corrected object detection data for updating the training dataset, wherein upon updating the training dataset, the generated object detection data is based, at least in part, on the updated training dataset; and
the video analysis system is configured to:
decode the live video stream;
transmit the decoded video to a computer vision application server using a configurable computer vision application programming interface, wherein the computer vision application server analyzes the transmitted video and returns object detection data; and
store the object detection data in the search engine.

7. The system of claim 1, wherein the server system records the live video;
wherein the supplemented and/or corrected object detection data comprise supplemented or corrected visual information provided by the live video stream.

8. The system of claim 1, wherein live search results are continually updated during the live video stream;
wherein the supplemented and/or corrected object detection data comprise supplemented or corrected color information provided by the live video stream.

9. The system of claim 1, wherein the search engine is configured to provide for display the search results along with associated images and/or video.

10. The system of claim 1, wherein the server system is further configured to receive the live video stream from an unmanned vehicle during operation;
wherein the object detection data comprises a location of the unmanned vehicle and/or the object; and
wherein the first client device is configured to control an operation of the unmanned vehicle.

11. A method comprising:
authenticating a video capture device against an identify provider to obtain an access code associated with resources of a server system;
establishing a websocket connection from the video capture device to the server system using transport layer security to the server system and the obtained access code for authentication;
receiving from the video capture device a live video stream captured by a sensor system;
rebroadcasting the live video stream to a first client device, and during the live video stream:
analyzing the live video stream to generate object detection data for objects identified in the live video stream;
performing, on the first client device, an operator assist operation comprising:
playing back data that was captured by the sensor system and pertains to a detected object, to provide the operator of the first client device with a view of what led up to the detection of the object, and providing the operator with a view of the generated object detection data;

receiving from the operator human-in-the-loop annotations to supplement and/or correct the generated object detection data; and supplementing and/or correcting the object detection data;

storing the supplemented and/or corrected object detection data and an identifier of the live video stream;

receiving, via a search engine, a text-based search request from a second client device; and generating a list of live and stored video content in response to the search request, wherein generating comprises searching the supplemented and/or corrected object detection data for relevant search results.

12. The method of claim 11, wherein the authenticating further comprises using an OAuth protocol.

13. The method of claim 11, wherein the websocket connection is used for WebRTC negotiation between the video capture device and the server system.

14. The method of claim 13, wherein, after WebRTC negotiation, the video capture device is configured to send video to the server system using a negotiated transport protocol, encryption keys, cypher, hostname, and port.

15. The method of claim 14, wherein:

analyzing the live video stream and the one or more annotations is performed by a computer vision system using a trained artificial intelligence system generating the object detection data based on a training dataset and using the supplemented and/or corrected object detection data for updating the training dataset, wherein upon updating the training dataset, the generated object detection data is based, at least in part, on the updated training dataset; and a peer-to-peer connection between the video capture device and the server system is established for transmitting the video.

16. The method of claim 15, wherein the peer-to-peer connection is established using WebRTC in conjunction with Interactive Connectivity Establishment (ICE), Session Traversal Utilities for NAT (STUN), and/or Traversal Using Relays around NAT (TURN).

17. The method of claim 15, wherein the peer-to-peer connection enables processing of the video through network firewalls.

18. The method of claim 11, further comprising encrypting, by the video capture device, the video and sending it using Secure Real-Time Transport Protocol.

19. The method of claim 11, where the video is sent using User Datagram Protocol, to reduce overhead and latency.

20. The method of claim 11, wherein the video capture device comprises an unmanned vehicle;

wherein the object detection data comprises a location of the unmanned vehicle and/or the object;

wherein the first client device is configured to control an operation of the unmanned vehicle; and the assist operation comprises providing the operator, on the first client device, with one or more of the following items applicable to a scenario pertaining to the detected object: data from a light detection and ranging (Lidar) system in the sensor system, real-world coordinate information from a global positioning satellite (GPS) system, and/or infrared images from the sensor system.

* * * * *

UNITED STATES PATENT AND TRADEMARK OFFICE
CERTIFICATE OF CORRECTION

| | | |
|---|---|---|
| PATENT NO. | : 12,452,327 B2 | Page 1 of 1 |
| APPLICATION NO. | : 17/825870 | |
| DATED | : October 21, 2025 | |
| INVENTOR(S) | : Alan Willemsen and Spencer Quin | |

It is certified that error appears in the above-identified patent and that said Letters Patent is hereby corrected as shown below:

In the Specification

Column 9, Line 56, change "with j son or xml text" to --with json or xml text--.

Signed and Sealed this
Second Day of December, 2025

John A. Squires
*Director of the United States Patent and Trademark Office*